(12) United States Patent
Naftel

(10) Patent No.: US 8,397,295 B1
(45) Date of Patent: Mar. 12, 2013

(54) METHOD AND APPARATUS FOR DETECTING A ROOTKIT

(75) Inventor: Timothy Michael Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 1057 days.

(21) Appl. No.: 12/004,205

(22) Filed: Dec. 20, 2007

(51) Int. Cl.
*G06F 21/00* (2006.01)

(52) U.S. Cl. .......................................................... 726/23

(58) Field of Classification Search ........................ None
See application file for complete search history.

(56) References Cited

U.S. PATENT DOCUMENTS

| | | | | |
|---|---|---|---|---|
| 7,398,389 B2 * | 7/2008 | Teal et al. | | 713/164 |
| 7,571,482 B2 * | 8/2009 | Polyakov et al. | | 726/24 |
| 7,631,357 B1 * | 12/2009 | Stringham | | 726/24 |
| 7,647,308 B2 * | 1/2010 | Sallam | | 707/769 |
| 7,660,797 B2 * | 2/2010 | Marinescu et al. | | 726/22 |
| 7,665,123 B1 * | 2/2010 | Szor et al. | | 726/2 |
| 7,676,845 B2 * | 3/2010 | Thomas et al. | | 726/26 |
| 7,814,549 B2 * | 10/2010 | Park | | 726/24 |
| 7,841,006 B2 * | 11/2010 | Gassoway | | 726/23 |
| 7,921,461 B1 * | 4/2011 | Golchikov et al. | | 726/23 |
| 7,926,106 B1 * | 4/2011 | Kennedy et al. | | 726/22 |
| 7,975,298 B1 * | 7/2011 | Venkatasubrahmanyam | | 726/22 |
| 8,166,544 B2 * | 4/2012 | Memon et al. | | 726/23 |
| 2003/0120935 A1 * | 6/2003 | Teal et al. | | 713/188 |
| 2005/0229250 A1 * | 10/2005 | Ring et al. | | 726/23 |
| 2006/0101263 A1 * | 5/2006 | Costea et al. | | 713/164 |
| 2006/0101264 A1 * | 5/2006 | Costea et al. | | 713/165 |
| 2006/0101282 A1 * | 5/2006 | Costea et al. | | 713/188 |
| 2006/0218637 A1 * | 9/2006 | Thomas et al. | | 726/23 |
| 2006/0272021 A1 * | 11/2006 | Marinescu et al. | | 726/24 |
| 2006/0294592 A1 * | 12/2006 | Polyakov et al. | | 726/24 |
| 2007/0055711 A1 * | 3/2007 | Polyakov et al. | | 707/203 |
| 2007/0079178 A1 * | 4/2007 | Gassoway | | 714/38 |
| 2008/0046977 A1 * | 2/2008 | Park | | 726/4 |
| 2008/0109906 A1 * | 5/2008 | Sallam | | 726/24 |
| 2008/0127344 A1 * | 5/2008 | Sallam | | 726/23 |
| 2008/0301426 A1 * | 12/2008 | Arges et al. | | 713/2 |
| 2009/0126019 A1 * | 5/2009 | Memon et al. | | 726/23 |
| 2009/0217377 A1 * | 8/2009 | Arbaugh et al. | | 726/23 |

OTHER PUBLICATIONS

"Detecting Stealth Software with Strider GhostBuster," Wang et al., Microsoft Research, Microsoft Corporation, Technical Report MSR-TR-2005-25, Feb. 21, 2005.*
"Analysis of hidden data in NTFS file system," Wee, Forensic Focus, Edith Cowan University, Jan. 2006.*
"Data Hiding in the NTFS file system," Huebner et al., Elsevier, ScienceDirect, Digital Investigation 3 (2006) 211-226, May 15, 2006.*
"NTFS Architecture and Structures," PCGuide, Master file Table (MFT), NTFS System (Metadata) Files, Apr. 17, 2001.*
"RootkitRevealer v1.71," Cogswell et al., Microsoft TechNet, Nov. 1, 2006.*
"Data Hiding in Journaling File Systems," Eckstein et al., Digital Forensic Research Workshop (DFRWS), 2005.*
Azy, "AK922: Bypassing Disk Low Level Scanning to Hide File," downloaded on Jan. 16, 2008 from web site: http://www.rootkit.com/newsread.php?newsid=783.

* cited by examiner

*Primary Examiner* — Oscar Louie

(74) *Attorney, Agent, or Firm* — Wilmer Cutler Pickering Hale and Dorr LLP

(57) ABSTRACT

A method and apparatus for detecting a rootkit is described. In one embodiment, a method for detecting a rootkit comprises analyzing file system information associated with a plurality of files that form a volume, wherein a first portion of the file system information comprises metadata information for a master file table and a second portion comprises at least one master file table record and identifying an inconsistency within the file system information where the inconsistency indicates a modification to the file system information by a rootkit.

18 Claims, 6 Drawing Sheets

| PLURALITY OF RECORDS | HEADER | MASTER FILE TABLE ATTRIBUTE_1 | ATTRIBUTE_2 | ATTRIBUTE_3 |
|---|---|---|---|---|
| 0 | | $FILE_NAME (MFT) | $BITMAP | $DATA |
| ⋮ | | | | |
| 6 | | $FILE_NAME (BITMAP) | | |
| ⋮ | | | | |
| 16 | (UPDATE SEQUENCE ARRAY) | $STANDARD_INFORMATION | $FILE_NAME (FILE_1) | $ATTRIBUTE_LIST |
| 17 | | $DATA | | |
| 18 | | $STANDARD_INFORMATION | $FILE_NAME (DIRECTORY_1) | $BITMAP |
| ⋮ | | | | |
| ⋮ | | | | |
| ⋮ | | | | |
| N | | | | |

FIG. 2

METHOD AND APPARATUS FOR DETECTING A ROOTKIT

BACKGROUND OF THE INVENTION

1. Field of the Invention

Embodiments of the present invention generally relate to computer security, more particularly, to a method and apparatus for detecting a rootkit within a computer system.

2. Description of the Related Art

Many computing environments (e.g., computer networks, home computers and the like) are constantly under alert for attacks orchestrated through various programs. Typically, the various programs (e.g., sets of processor-executable instructions) are developed by attackers (e.g., hackers) who desire to disrupt the operations of the computing environment. For example, rootkits are employed to illegitimately obtain system administrator rights to the computing environment and use the system administrator status to exert command and control over various components of the computing environment.

Rootkits, generally comprise software programs that enable the attacker to become the system administrator. Typically, the attacker installs the rootkit on a computer after first obtaining user-level access, either by exploiting a known vulnerability or cracking a password. Once the rootkit is installed, it allows the attacker to mask the intrusion and avoid detection by known anti-rootkit methods as well as to gain privileged access (e.g., root or system administrator level access) to the computer and, possibly, other computers in the computing environment. With privileged access, the attacker can execute files and change system configurations. The attacker may also access operating system log files and/or covertly spy on the computer and/or computing environment.

Anti-rootkit detection and/or removal software developers and rootkits developers are playing a game of cat and mouse where each side develops software to overcome an improvement developed by the other side. For example, the rootkit developers almost immediately create software to avoid detection by the latest anti-rootkit software. For example, various types of anti-rootkit software detect rootkits by comparing files names read from the Master File Table (MFT) records with files names returned from one or more functions (e.g., FindFirstFile( ), FindNextFile( ) and the like) implemented in the WIN32 (i.e. Windows 32-bit) Application Programming Interface (API). Discrepancies identified by the comparison indicate the presence of the rootkit. Rootkit developers, however, quickly modified their methodology and masked their intrusion from the above detection mechanism, thereby rendering the various types of the anti-rootkit software ineffective.

Therefore, there is a need for a method and apparatus for efficiently detecting a rootkit within a computer system when the rootkit modifies file system information.

SUMMARY OF THE INVENTION

Embodiments of the present invention generally comprise a method and apparatus for detecting a rootkit within a computer system. In one embodiment, a method for detecting a rootkit comprises analyzing file system information associated with a plurality of files that form a volume, wherein a first portion of the file system information comprises metadata information for a master file table and a second portion comprises at least one master file table record and identifying an inconsistency within the file system information where the inconsistency indicates a modification to the file system information by a rootkit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is an illustrative example of a Master File Table (MFT) according to one or more embodiments of the present invention;

DETAILED DESCRIPTION

Figure 1:
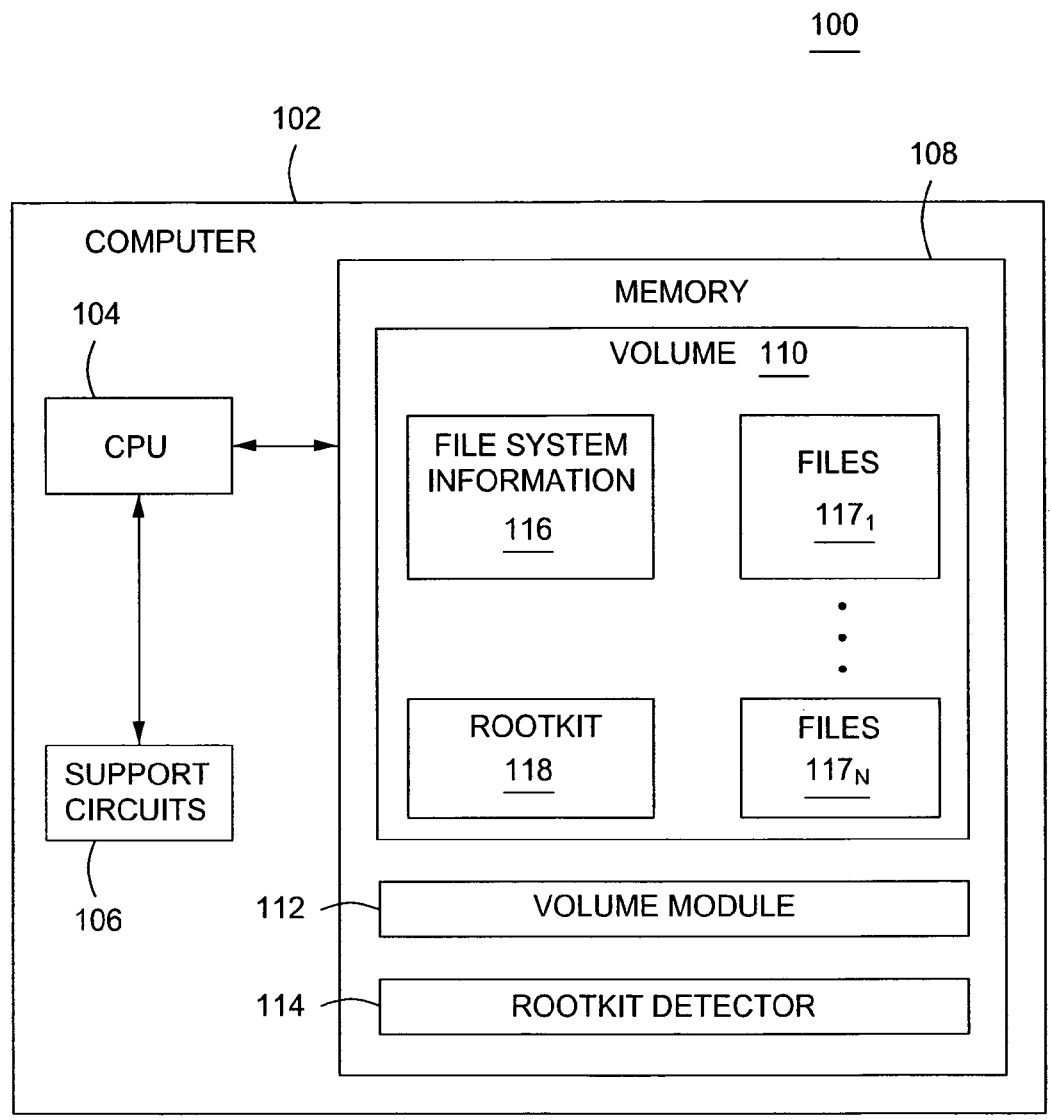
FIG. 1 is a block diagram of a computer system for detecting a rootkit according to one or more embodiments of the present invention.

FIG. 1 is block diagram of a computer system 100 for detecting a rootkit according to one or more embodiments of the present invention. The computer system 100 comprises a computer 102 among various other devices (e.g., peripheral devices, networking components, storage devices and the like).

The computer 102 comprises various support circuits 104, a central processing unit (CPU) 106 and a memory 108. The CPU 106 may be one or more of any commercially available microprocessors or microcontrollers. The various support circuits 106 facilitate the operation of the CPU 106. The support circuits 106 include, for example, input/output circuits, system bus, PCI bus, clock circuits, power supplies and the like. The memory 108 may comprise random access memory, read only memory, optical memory, disk drives, removable memory, and the like. The memory 108 includes a volume 110, which may be a partition that is provisioned and organized in accordance with a New Technology File System (NTFS). The memory 108 further includes various software packages, such as a volume module 112 and a rootkit detector 114.

The volume 110 further includes file system information 116, a plurality of files and a rootkit 118. The file system information 116 represents the organization and content of the plurality of files 117 that form the volume 110. As such, the file system information 116 is the foundation of the volume 110. In one embodiment, the plurality of files 117 includes a plurality of data files and a plurality of directories because a directory is considered a file in a NTFS volume (e.g., the volume 110). The rootkit 118, as explained above, desires administrator control over the volume 110 in order to attack the computer 102.

In one embodiment, the file system information 116 is a Master File Table (MFT) including any non-resident information associated with any record of the Master File Table (e.g., non-resident data or attribute records). In this embodiment, the Master File Table comprises a plurality of records defining the plurality of files 117 that form the volume 110. In one embodiment, a first portion of the file system information 116 may be metadata for the volume 110 (e.g., first 16 records of the MFT is metadata for the MFT itself) and a second portion of the file system information 116 may be one or more MFT records for each of the plurality of files 117 within the volume 110. In one embodiment, each MFT record comprises one or more attributes that describe the file and/or the directory including information pertaining to one or more allocated clusters within the volume 110.

The volume module 112 and the rootkit detector 114 cooperate to identify inconsistencies within the file system information 116 where the inconsistencies are caused by one or more modifications to the file system information 116 by the rootkit 118. The rootkit 118 modifies the file system information 116 in an effort to avoid detection. For example, the rootkit 118 may hide in one or more files within the plurality of files 117 by modifying a MFT record that comprises a file name associated with the rootkit 118. Accordingly, one or more identified inconsistencies strongly indicate an intrusion by the rootkit 118.

In one or more embodiments, the volume module 112 accesses and analyzes the file system information 116 associated with the plurality of files 117 and the rootkit detector 114 identifies the one or more inconsistencies within the file system information 116. In some embodiments, the volume module 112 and/or the rootkit detector 114 correlate various records of the plurality of records of the MFT in order to identify the one or more inconsistencies.

FIG. 2 is an illustrative example of a Master File Table (MFT) 200 according to one or more embodiments of the present invention. The MFT 200 stores the information required to retrieve files from the volume 110 (e.g., an NTFS partition). As explained above, the MFT 200 is the file system information 116 according to one or more embodiments. It is appreciated that the following describes one embodiment of the MFT 200. Embodiments of the present invention include various implementations of a Master File Table.

The MFT 200 comprises a plurality of MFT records 202. Each MFT record of the plurality of MFT records 202 includes information pertaining to a file (e.g., the MFT, directories, data files and the like) within the volume 110. Each MFT record also indicates a position of the MFT record in the MFT (i.e. a record number). FIG. 2 illustrates the record number of the MFT record under column "RECORD #". In one or more embodiments, such information is expressed through a header (e.g., FILE_RECORD_SEGMENT_HEADER) as well as one or more attributes and associated values. The headers of the plurality of records 202 are illustrated in FIG. 2 under a column labeled "HEADER". Each header, generally, includes information describing an associated MFT record (e.g., allocation information, size information, update sequence arrays, flags and the like). For example, the header (e.g., a flag bit set in the header) may indicate whether the MFT record is allocated (e.g., used in the volume 110 and not deleted). The one or more attributes are illustrated in FIG. 2 under columns "ATTRIBUTE_1", "ATTRIBUTE_2" and "ATTRIBUTE_2" and are referred to as Attribute_1, Attribute_2 and Attribute_3 in the following description for the plurality of records 202.

Metadata for the MFT 200 is stored within a first portion of the MFT 200 itself. In one embodiment, the volume 110 reserves the first 16 records for storage of the metadata information of the MFT 200 (e.g., record numbers 0-15). The metadata information includes a MFT file, a BITMAP file, among others (e.g., a root directory, a MFT mirror file and the like). Specifically, the MFT file and the BITMAP file are stored in records zero and six, respectively. The headers for the MFT file and the BITMAP file include information describing each file, as indicated above.

As explained above, the metadata describes the MFT 200 for the volume 110. In particular, Attribute_1 for the MFT file and the BITMAP file is a $File_Name attribute type and includes file names "MFT" and "BITMAP", respectively. Attribute_2 for the MFT file is a $Bitmap attribute type. The $Bitmap attribute includes information regarding which ones of the plurality of MFT records 202 are allocated (e.g., used by the volume 110). Attribute_3 for the MFT file is a $Data attribute type and includes a plurality of headers associated with the plurality of MFT records 202. For the BITMAP file, Attribute_2 is the $Data attribute type and includes information regarding a plurality of allocated clusters in the volume 110.

A second portion of the MFT 200 comprises one or more MFT records for each file or directory in the volume 110. For example, record 16 describes a data file. In this example, a header of the record 16 includes an Update Sequence Array, as described below, in addition to information describing the record 16. Attribute_1 indicates $Standard_Information for the record 16. Furthermore, Attribute_2 is the $File_Name attribute type. The $Standard_Information attribute type includes read/write permissions, a number of directories that index record 16 (i.e. the file File_1), timestamps and the like. Attribute_3 for the record 16 is an $Attribute_List attribute type. Generally, the $Attribute_List includes pointers to other MFT records that include one or more additional attributes. Accordingly, a pointer in the $Attribute_List Attribute_3 of the record 16 refers to a record 17 as the location of one or more additional attributes. Here, Attribute_1 of the record 17 is the $Data attribute type and includes allocated cluster data for the File_1.

The Update Sequence Array (USA), generally, is an array of the values which belong to an end of each sector in a MFT record. Note that a first entry in the USA is an Update Sequence Number, which is a cyclic counter of a number of times the MFT record has been written to a disk. Before the MFT record is written to the disk, the last two bytes of each sector are copied to the USA in the header. A sector, generally, is a unit of data on a disk. The update sequence number is then incremented and written to the end of each sector in the MFT record. Before the MFT record is read from the disk, the ends of each sector must match the Update Sequence Number in the header. If there is no match, an incomplete multi sector transfer has occurred when the MFT record was written.

Furthermore, record 18 describes a directory in the volume 110. Accordingly, Attribute_1 is the $Standard_Information attribute. Attribute_2 is the $File_Name attribute and includes the value "Directory_1". Attribute_3 is the $Bitmap attribute, which represents index information for one or more files (e.g., the File_1) within the Directory_1 in the form of a Balanced Tree (BTree) as known in the art, as explained below. Here, the BTree in the $Bitmap attribute comprises a plurality of entries, where each entry indicates a file name, one or more MFT records, allocated cluster data and/or the like for the one or more files within the Directory_1.

BTrees, generally, comprise a data structure for storing and organizing a plurality of nodes where each parent node may have any number of children nodes and comprise any number of keys. The keys are stored in non-decreasing order. Hence, each key has an associated left child node that is the parent of a sub-tree comprising one or more nodes with keys less than or equal to the each key but greater than a preceding key. Moreover, the each key has an associated right child node that is the parent of a sub-tree comprising one or more nodes with keys greater than the each key.

Figure 3:
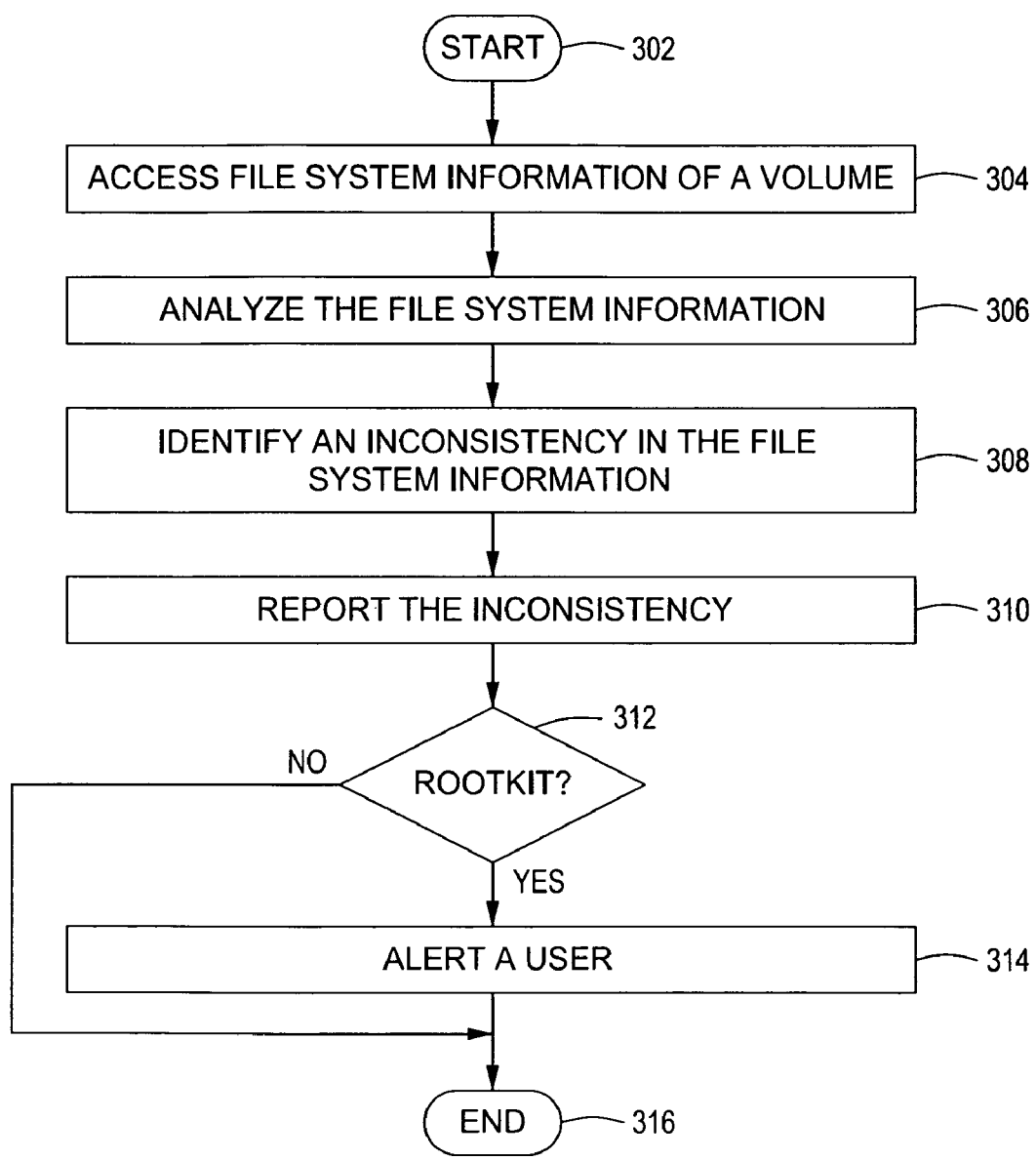
FIG. 3 is a flow diagram of a method for reporting an inconsistency within file system information of the computer system according to one or more embodiments of the present invention.

FIG. 3 is a flow diagram of a method 300 for reporting an inconsistency within file system information of the computer system according to one or more embodiments of the present invention. The method 300 begins at step 302 and proceeds to step 304. At step 304, file system information of a volume is accessed. At step 306, the file system information is analyzed. At step 308, one or more inconsistencies are identified. Various embodiments of the identification process are described further below for FIGS. 4 and 5. At step 310, the identified one or more inconsistencies are reported.

At step 312, a determination is made as to whether a rootkit is present in the computer system. According to various embodiments, the rootkit is present if certain inconsistencies were reported, as explained below. If the rootkit is present, then the method 300 proceeds to step 314. At step 314, a user is alerted as to the detection of the rootkit. Alternatively, the method 300 may alert software designed to remove rootkits, such as the SYMANTEC NORTON SOFTWARE SUITE. If the rootkit is not present, then the method 300 proceeds to step 316. At step 316, the method 300 ends.

Figure 4:
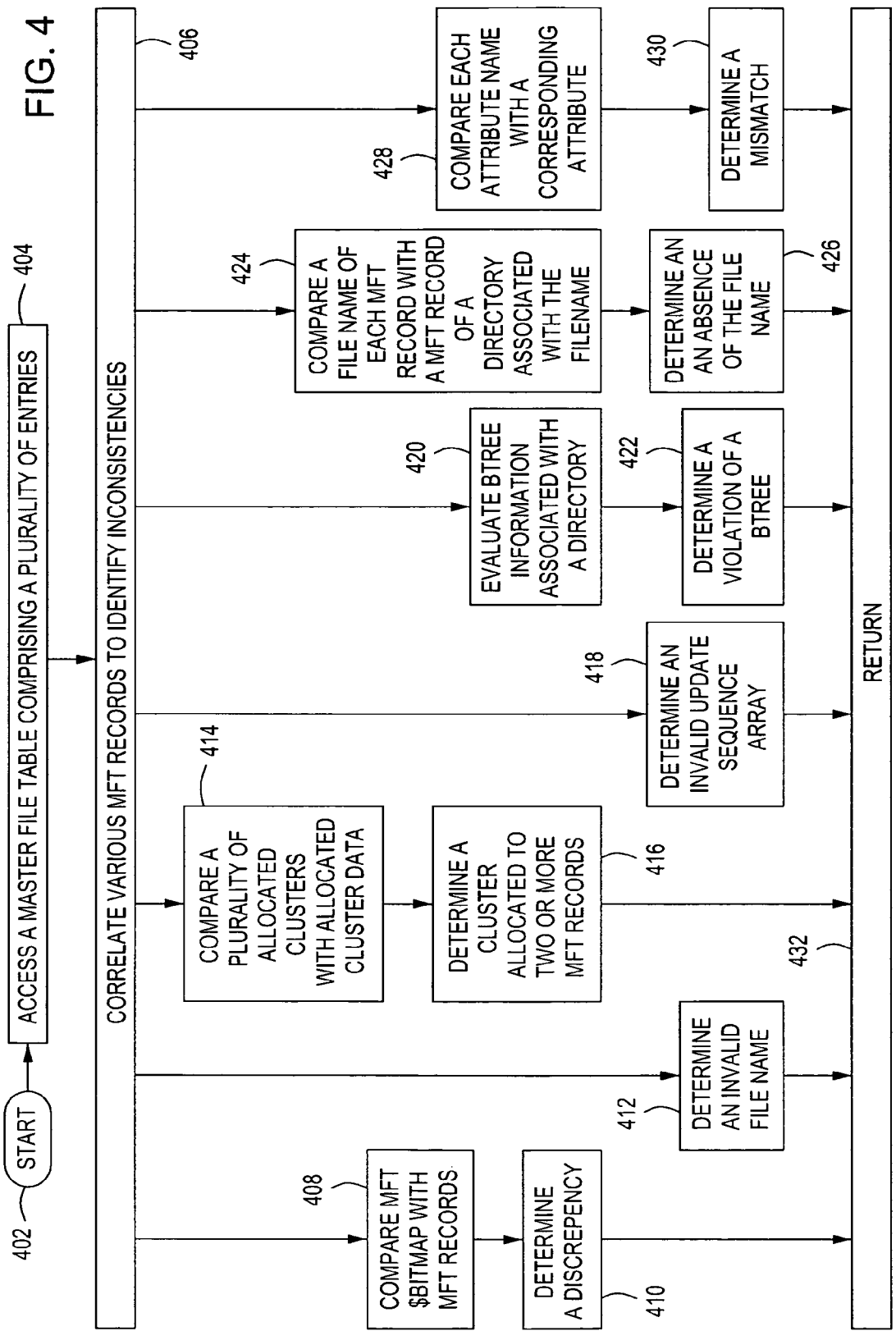
FIG. 4 is a flow diagram of a method for correlating various entries of a master file table according to one or more embodiments of the present invention.

FIG. 4 is a flow diagram of a method 400 for correlating various records of a master file table to identify inconsistencies within the MFT according to one or more embodiments of the present invention. The method 400 begins at step 402 and proceeds to step 404. At step 404, a master file table (MFT) comprising a plurality of MFT records (e.g., such records including information regarding files, attributes, directories and the MFT itself (i.e. metadata)) is accessed. At step 406, various records of the plurality of records are correlated to identify one or more inconsistencies within the MFT.

In one embodiment, the method 400 performs steps 408-410 to identify a first inconsistency. At step 408, MFT $BITMAP (i.e. the $Bitmap attribute of the MFT file) is compared with the plurality of MFT records. The MFT $BITMAP represents the allocation of each and every record of the plurality of MFT records for files and directories. Hence, the MFT $BITMAP shows which MFT records are allocated or unallocated according to one embodiment. At step 410, a discrepancy between the MFT $BITMAP and the plurality of MFT records is determined. For example, the discrepancy exists if a MFT record is allocated in the MFT $BITMAP, but the MFT record is marked as unallocated (e.g., denoted in a flag in a header associated with the MFT record). In one embodiment, the rootkit modifies the MFT record as such to hide the rootkit file name in an unallocated MFT record.

In another embodiment, the method 400 performs step 412 to identify a second inconsistency. At step 412, an invalid fine name within the plurality of MFT records is determined. Each MFT record may include one or more file names. For example, a MFT record for a single file includes the file name within the file name attribute (e.g., the File_Name attribute of FIG. 2). For another example, the file name is invalid if it comprises null data, invalid character or all zeros. In one embodiment, the rootkit modifies or overwrites the file name to hide the rootkit file name.

In another embodiment, the method 400 performs steps 414-416 to identify a third inconsistency. At step 414, a plurality of allocated clusters associated with the first portion is compared with allocated cluster data of the second portion. As explained above for FIG. 2, the BITMAP file represented by the record 6 in the MFT 200 includes information pertaining to the plurality of allocated clusters. In one embodiment, the $Data Attribute of the BITMAP file stores such information. Also explained above for FIG. 2, at least one MFT record of the plurality of MFT records 202 in the second portion comprises a $Data attribute, which includes the allocated cluster data for a file associated with the at least one MFT record. If the file is a directory, the $Bitmap attribute includes the allocated cluster data for each and every file in the directory. At step 416, a cluster that is allocated to two or more MFT records is determined. In one embodiment, if there are two MFT records allocated to the same cluster, the rootkit modified a first MFT record to show that a legitimate file has allocated a cluster when the rootkit allocated the cluster in a second MFT record to avoid detection.

In another embodiment, the method 400 performs step 418 to identify a fourth inconsistency. At step 418, an invalid Update Sequence Array (USA) is determined. For example, an Update Sequence Array in any of the plurality of MFT records is invalid if there is a mismatch between an Update Sequence Number in a header and last two bytes of each cluster. In one embodiment, the rootkit modifies the Update Sequence Array to prevent the MFT record from being read.

In another embodiment, the method 400 performs steps 420-422 to identify a fifth inconsistency. At step 420, BTree information is evaluated. As explained above, the BTree information is associated with a BTree comprising a plurality of entries that represent index information for a directory. In one embodiment, the BTree information includes file names, allocated cluster data and the like associated with one or more files under the directory. At step 422, a violation of a BTree is determined. The BTree is governed by certain semantics of which the plurality of entries must comply or violate the BTree, as explained above. For example, a modification to one of the files names within the directory causes the violation of the BTree by disturbing the organization of the BTree. In this example, the modified file name would not be in a correct position in the BTree to enable logarithmic searching and would serve to disrupt future insertions and/or deletions of one or more entries. The rootkit modifies the BTree information to a MFT record comprising the rootkit file name since any modified entry (e.g., file name) in the BTree cannot be used to locate the MFT record comprising the rootkit file name.

In another embodiment, the method 400 performs steps 424-426 to identify a sixth inconsistency. At step 424, each file name of the plurality of MFT records is compared with a MFT record for a directory associated with the file name. In one embodiment, the each file name is compared with each file name under the directory (e.g., each file name in the plurality of entries of the BTree). At step 426, an absence of the file name within of the MFT record for the directory is determined. The absent file name indicates a modification by the rootkit to avoid detection.

In another embodiment, the method 400 performs steps 428-430 to identify a seventh inconsistency. At step 428, an attribute name within attribute list information of a MFT record is compared with a corresponding attribute in the MFT. In one embodiment, the corresponding attribute comprises a non-resident attribute for a base MFT record (e.g., an attribute that is too large for the base MFT record). At step 430, a mismatch between the attribute name within the attribute list information and the corresponding attribute is determined. The mismatch indicates a modification by the rootkit. At step 432, the method 400 returns to step 308 of the method 300.

Figure 5A:
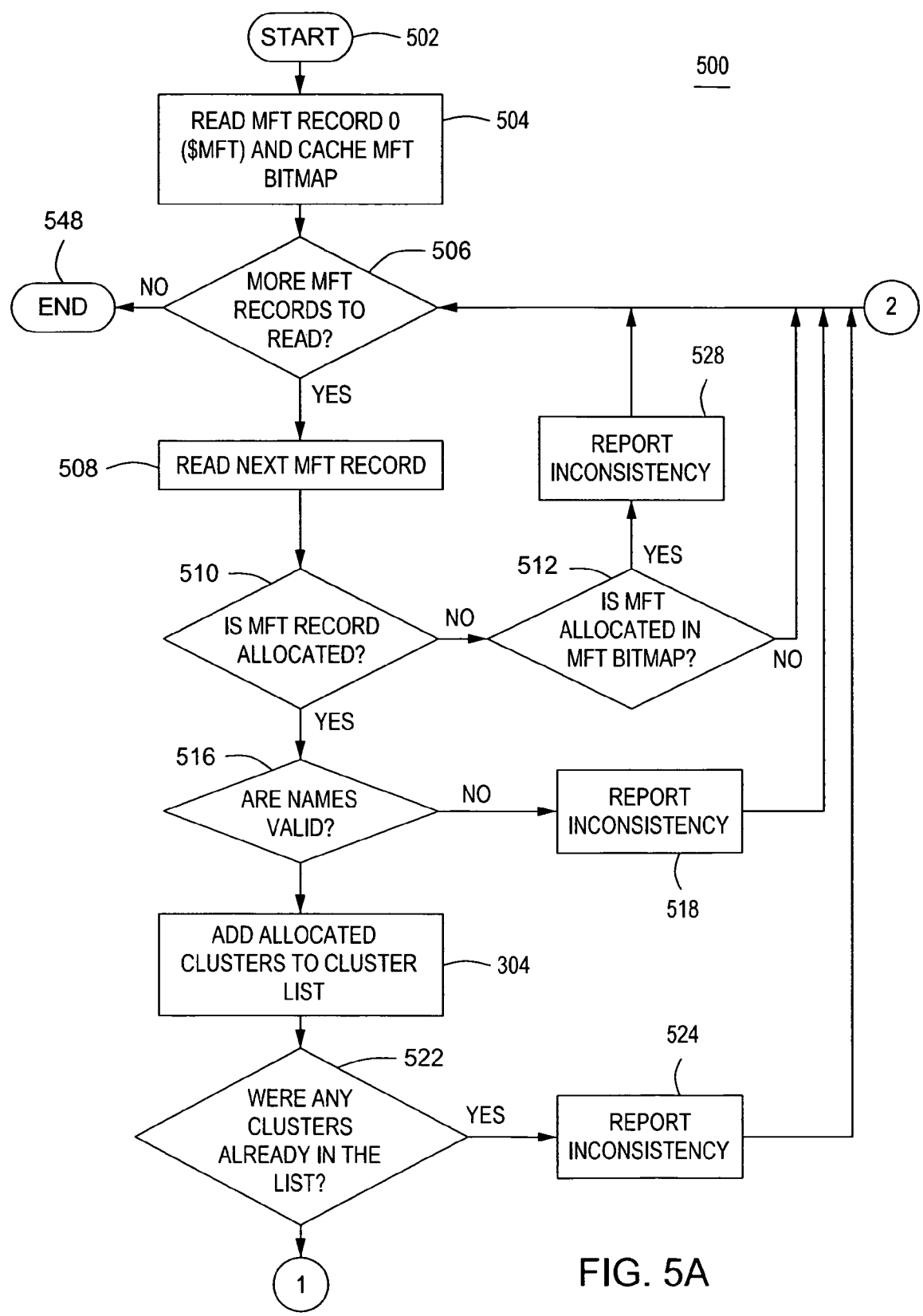
FIGS. 5A and 5B depict a flow diagram of a method for identifying an inconsistency in the master file table according to one or more embodiments of the present invention.
Figure 5B:
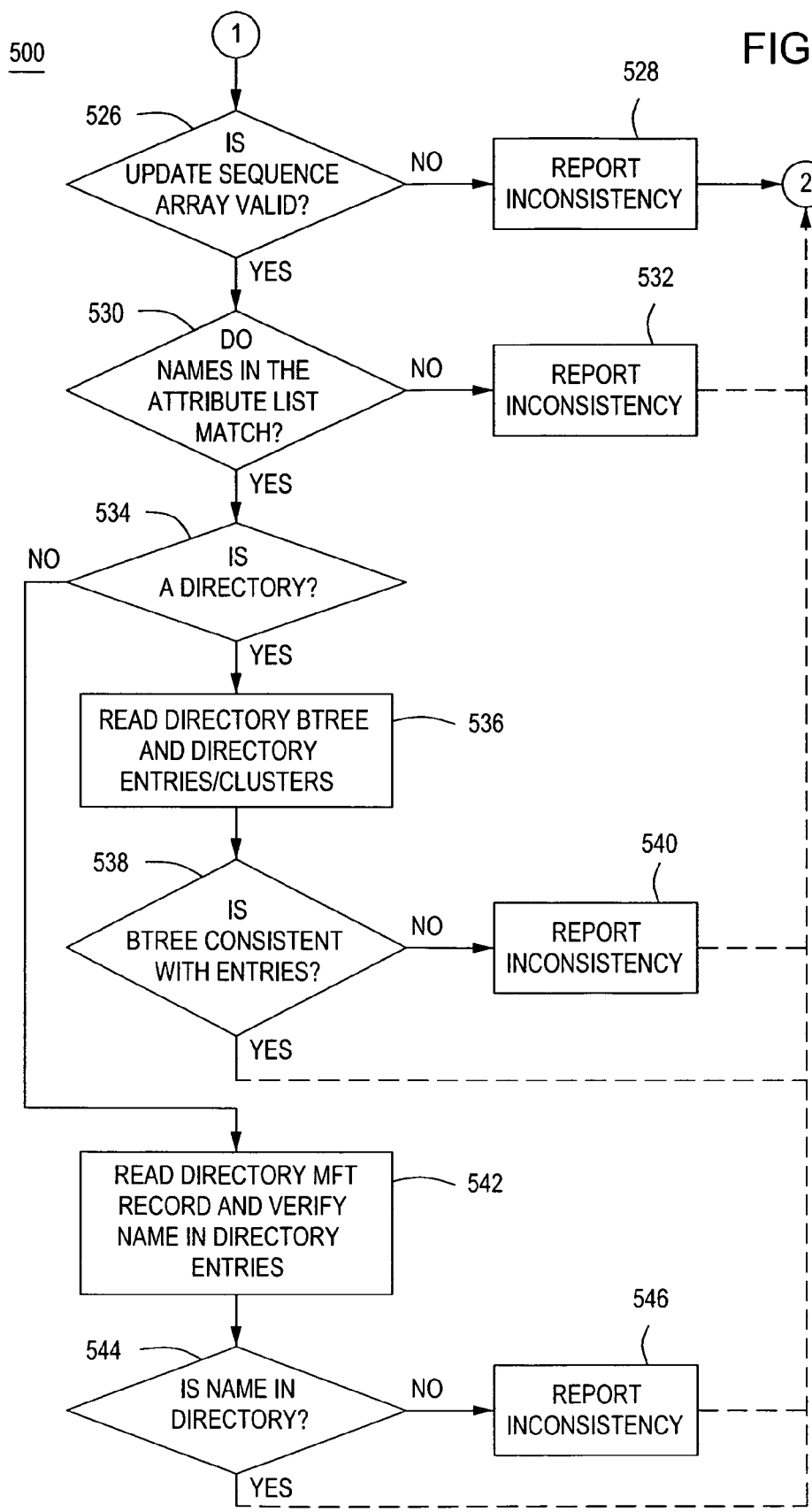

FIGS. 5A and 5B depict a flow diagram of a method 500 for identifying an inconsistency in the master file table according to one or more embodiments of the present invention.

The method 500 begins at step 502 and proceeds to step 504. At step 504, a MFT Record #0 is accessed and values for a $Bitmap attribute are stored in a cache. At step 506, a determination is made as to whether there are more MFT records to read. If there are no more MFT records to read, the method 500 proceeds to step 548. At step 548, the method 500 ends. If there are more MFT records to read, the method 500 proceeds to step 508.

At step 508, a next MFT record is accessed. At step 510, a determination is made as to whether the next MFT record is allocated. If the next MFT record is allocated, the method 500 proceeds to step 516. If the next MFT record is not allocated, the method 500 proceeds to step 512. At step 512, a determination is made as to whether the next MFT record is allocated in the cached attribute $Bitmap. If the next MFT record is allocated in the cached attribute $Bitmap, a rootkit most likely modified the next MFT record to mask the intrusion. In accordance with various embodiments of the present invention, the method 500 proceeds to step 514, where such an inconsistency is reported.

At step 516, a determination is made as to whether each and every file name in the next MFT record is valid. If any of the file names are not valid, the rootkit most likely modified or deleted one or more file names in the next MFT record to avoid detection. In accordance with various embodiments of the present invention, the method 500 proceeds to step 518, where such an inconsistency is reported. If each and every file name is valid, the method proceeds to step 520.

At step 520, a plurality of allocated clusters associated with the next MFT record is added to an allocated cluster list. At step 522, a determination is made as to whether one or more of the plurality of allocated clusters were already in the allocated cluster list. If one or more of the plurality of allocated clusters were already in the allocated cluster list, the one or more allocated clusters are allocated to more than one MFT record. The rootkit most likely allocated one or more previously allocated clusters to avoid detection since the presence of one or more allocated clusters that are not associated with any MFT record exposes the rootkit to anti-rootkit software. In accordance with various embodiments of the present invention, the method 500 proceeds to step 524, where such an inconsistency is reported. If none of the plurality of allocated clusters were already in the allocated cluster list, then the method proceeds to step 526.

At step 526, a determination is made as to whether an update sequence array is valid. If the update sequence array is not valid, the rootkit most likely modified, deleted or corrupted the update sequence array to avoid detection. In accordance with various embodiments of the present invention, the method 500 proceeds to step 528, where such an inconsistency is reported. If the update sequence array is valid, the method 500 proceeds to step 530.

At step 530, a determination is made as to whether each and every attribute name in an attribute list matches corresponding attribute names in areas of the MFT associated with each and every attribute name. As explained in FIG. 2, the attribute list is a type of attribute in a MFT record and contains pointers to locations in the MFT comprising one or more non-resident attributes of the MFT record. In accordance with various embodiments of the present invention, the method 500 proceeds to step 532, where such an inconsistency is reported. If each and every attribute name matches the corresponding attribute names, then the method 500 proceeds to step 534.

At step 534, a determination is made as to whether the next MFT record is represents a directory. If the next MFT record does not represent a directory, the method 500 proceeds to step 542. If the next MFT record does represent a directory, the method 500 proceeds to step 536. At step 536, a BTree is accessed. The BTree includes a plurality of entries representing a plurality of files within the directory. At step 538, a determination is made as to whether the BTree is consistent with the plurality of entries. If the BTree is not consistent, the rootkit most likely modified, deleted or corrupted one or more of the plurality of entries to avoid detection. In accordance with various embodiments of the present invention, the method 500 proceeds to step 540, where such an inconsistency is reported. If the BTree is consistent, the method 500 returns to step 506.

At step 542, a directory MFT record associated with the next MFT record is accessed to verify the file name of the next MFT record in the associated directory. At step 544, a determination is made as to whether the file name is in the associated directory MFT record. If the file name is not in the associated directory MFT record, the rootkit most likely modified, deleted or corrupted the next MFT record to appear to belong to a legitimate directory. In accordance with various embodiments of the present invention, the method 500 proceeds to step 546, where such an inconsistency is reported. If the file name is in the directory MFT record, the method 500 returns to step 506. If there are no more MFT records in the MFT, the method 500 proceeds to step 548. At step 548, the method 500 ends.

While the foregoing is directed to embodiments of the present invention, other and further embodiments of the invention may be devised without departing from the basic scope thereof, and the scope thereof is determined by the claims that follow.

What is claimed is:

1. A method of using file system information to detect a rootkit, comprising:
   analyzing, via at least one computer processor, file system information associated with a plurality of files that form a volume, wherein a first portion of the file system information comprises metadata information for a master file table and a second portion comprises at least one master file table record;
   identifying an inconsistency within the file system information where the inconsistency indicates a modification to the file system information by a rootkit, wherein the rootkit enables a user to improperly obtain system administrator rights;
   wherein the identifying the inconsistency further comprises determining an invalid update sequence array, wherein the invalid update sequence array is an inconsistency;
   reporting the inconsistency within the file system information based on the modification to the file system information; and
   alerting a user as to the detection of the rootkit based on the identified inconsistency within the file system information.

2. The method of claim 1, wherein analyzing the file system information further comprises correlating various records of the master file table of the file system information.

3. The method of claim 1, wherein identifying the inconsistency further comprises comparing master file table $BITMAP data with the at least one master file table record to determine the inconsistency, wherein the inconsistency is an unallocated at least one master file table record that is marked as allocated and, wherein the first portion of the file system information includes the master file table $BITMAP data.

4. The method of claim 1, wherein identifying the inconsistency further comprises determining an invalid file name within the file system information, wherein the invalid file name is the inconsistency.

5. The method of claim 1, wherein identifying the inconstancy further comprises determining a cluster that is allocated to at least two master file table records of the second portion of the file system information, wherein the allocation to at least two master file table records is the inconsistency.

6. The method of claim 5, wherein determining the allocation further comprises:
   accessing allocated cluster data within any of the at least one master file table record of the second portion of the file system information; and
   comparing a plurality of allocated clusters associated with the first portion with the allocated cluster data to determine a previously allocated cluster, wherein the previously allocated cluster indicates the allocation to at least two master file table records.

7. The method of claim 1, wherein identifying the inconsistency further comprises:
   accessing attribute list information within the at least one master file table records; and
   comparing each attribute name referenced by the attribute list information with a corresponding attribute in the master file table to determine a mismatch, wherein the mismatch is the inconsistency.

8. The method of claim 1, wherein identifying the inconsistency further comprises:
   accessing BTree information within any of the master file table records of the second portion of the file system information, wherein the BTree information includes allocated cluster data associated with a directory; and
   evaluating the BTree information to determine a violation of a BTree representing a second plurality of files that forms the directory.

9. The method of claim 1, wherein identifying the inconsistency further comprises comparing a file name of each of the at least one master file table record with at least one file name within a master file table record for a directory associated with the file name to determine an absence of the file name within the master file table record for the directory, wherein the absence is the inconsistency.

10. An apparatus for using file system information to detect a rootkit, comprising:
    one or more computer processors communicatively coupled to a network wherein the one or more computer processors are configured to:
    access, via a volume module, file system information associated with a plurality of files that form a volume and analyzing the file system information, wherein a first portion of the file system information comprises metadata information for a master file table and a second portion comprises at least one master file table record; and
    identify, via a rootkit detector, an inconsistency within the file system information where the inconsistency indicates a modification to the file system information by a rootkit, wherein the rootkit enables a user to improperly obtain system administrator rights;
    wherein the rootkit detector determines an invalid update sequence array, wherein the invalid update sequence array is an inconsistency;
    report the inconsistency within the file system information based on the modification to the file system information; and
    alert a user as to the detection of the rootkit based on the identified inconsistency within the file system information.

11. The apparatus of claim 10, wherein the volume module correlates various records of the master file table of the file system information.

12. The apparatus of claim 10, wherein rootkit detector compares master file table $BITMAP data with the at least one master file table record to determine the inconsistency, wherein the first portion of the file system information includes the master file table $BITMAP data.

13. The apparatus of claim 10, wherein the rootkit detector verifies a validity of each file name within each of the at least one master file table records, wherein an invalid file name is the inconsistency.

14. The apparatus of claim 10, wherein the rootkit detector determines a cluster that is allocated to at least two master file table records of the second portion of the file system information, wherein the allocation to at least two master file table records is the inconsistency.

15. The apparatus of claim 10, wherein the rootkit detector accesses attribute list information associated with any of the master file table records of the second portion of the file system information and compares each attribute name within the attribute list information to an attribute name of each corresponding attribute within the file system information to determine a mismatch, wherein the mismatch is the inconsistency.

16. The apparatus of claim 10, wherein the rootkit detector accesses BTree information within any of the master file table records of the second portion of the file system information, wherein the BTree information includes allocated cluster data associated with a directory and evaluates the BTree information to determine an a violation of a BTree representing a plurality of files that form the directory.

17. The apparatus of claim 10, wherein the rootkit detector compares a file name of any of the at least one master file table records with at least one file name within a master file table record for a directory associated with the file name to determine a mismatch, wherein the mismatch is the inconsistency.

18. A method of using a master file table to detect a rootkit, comprising:
    analyzing, via at least one computer processor, a master file table associated with a plurality of files that form a volume, wherein the master file table comprises a plurality of records, where a first portion of the plurality of records comprises metadata information for the master file table and a second portion comprises at least one master file table record; and
    correlating various records of the plurality of records of the master file table to identify an inconsistency within the master file table where the inconsistency indicates a modification to the file system information by a rootkit, wherein the rootkit enables a user to improperly obtain system administrator rights;
    wherein the correlating various records of the plurality of records of the master file table to identify an inconsistency within the master file table further comprises determining an invalid update sequence array, wherein the invalid update sequence array is an inconsistency;
    reporting the inconsistency within the file system information based on the modification to the file system information; and
    alerting a user as to the detection of the rootkit based on the identified inconsistency within the file system information.

* * * * *